United States Patent
DeNatale

(10) Patent No.: US 8,370,852 B2
(45) Date of Patent: *Feb. 5, 2013

(54) INTER-OBJECT COMMUNICATION

(75) Inventor: Richard J. DeNatale, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 51 days.

This patent is subject to a terminal disclaimer.

(21) Appl. No.: 12/914,056

(22) Filed: Oct. 28, 2010

(65) Prior Publication Data

US 2011/0041139 A1    Feb. 17, 2011

Related U.S. Application Data

(63) Continuation of application No. 12/237,272, filed on Sep. 24, 2008, now Pat. No. 7,877,756, which is a continuation of application No. 10/097,996, filed on Mar. 14, 2002, now Pat. No. 7,464,384.

(51) Int. Cl.
*G06F 9/44* (2006.01)
*G06F 17/30* (2006.01)

(52) U.S. Cl. ........................ 719/315; 726/27

(58) Field of Classification Search .................. 719/315; 726/27

See application file for complete search history.

(56) References Cited

U.S. PATENT DOCUMENTS

| | | |
|---|---|---|
| 4,755,939 A | 7/1988 | Watson |
| 5,202,981 A | 4/1993 | Shackelford |
| 5,737,607 A | 4/1998 | Hamilton et al. |
| 5,832,529 A | 11/1998 | Wollrath et al. |
| 5,848,272 A | 12/1998 | Breggin et al. |
| 5,974,469 A | 10/1999 | Shoji et al. |
| 5,978,846 A | 11/1999 | Kimishima |
| 6,044,205 A | 3/2000 | Reed et al. |
| 6,088,694 A | 7/2000 | Burns et al. |
| 6,209,018 B1 | 3/2001 | Ben-Shachar et al. |
| 6,253,215 B1 | 6/2001 | Agesen et al. |
| 6,292,773 B1 | 9/2001 | Bernardes et al. |
| 6,321,190 B1 | 11/2001 | Bernardes et al. |
| 6,324,549 B1 | 11/2001 | Gomi et al. |
| 6,421,704 B1 | 7/2002 | Waldo et al. |
| 6,430,599 B1 | 8/2002 | Baker et al. |
| 6,564,240 B2 | 5/2003 | Waldo et al. |
| 6,604,127 B2 | 8/2003 | Murphy et al. |

(Continued)

FOREIGN PATENT DOCUMENTS

| | | |
|---|---|---|
| EP | 1056007 A2 | 11/2000 |
| JP | 07-282010 A | 10/1995 |

OTHER PUBLICATIONS

United States Patent and Trademark Office, Office Action for U.S. Appl. No. 10/097,996, Nov. 2, 2004, pp. 1-10, Alexandria, VA, USA.

(Continued)

*Primary Examiner* — Charles E Anya
(74) *Attorney, Agent, or Firm* — Lee Law, PLLC; Christopher B. Lee

(57) ABSTRACT

A partnership object is created to manage interactions between objects in an object oriented computing environment. An interaction license is issued by a licensing framework executing on a computing device to each of a group of objects indicating that the group of objects is authorized to form partnerships, where the group of objects interact by requesting formation of the partnerships using the provided interaction licenses. A first object requests to interact with a second object. A partnership object is created and each of the first and second objects is provided with a reference to the partnership object. The request from the first object may include identifiers of licenses associated with the first and second object and the partnership object may be created only if both licenses are validated. The first object then is able to interact with the second object by using the reference to the partnership object.

18 Claims, 2 Drawing Sheets

U.S. PATENT DOCUMENTS

| | | | |
|---|---|---|---|
| 6,775,833 | B1 | 8/2004 | Gits et al. |
| 6,823,519 | B1 | 11/2004 | Baird et al. |
| 6,842,754 | B2 | 1/2005 | Muntz |
| 6,959,320 | B2 | 10/2005 | Shah et al. |
| 2002/0078077 | A1 | 6/2002 | Baumann et al. |
| 2003/0055877 | A1 | 3/2003 | Williams et al. |
| 2003/0126164 | A1 | 7/2003 | O'Connor et al. |

OTHER PUBLICATIONS

United States Patent and Trademark Office, Office Action for U.S. Appl. No. 10/097,996, Jun. 10, 2005, pp. 1-9, Alexandria, VA, USA.

United States Patent and Trademark Office, Office Action for U.S. Appl. No. 10/097,996, Sep. 28, 2005, pp. 1-12, Alexandria, VA, USA.

United States Patent and Trademark Office, Office Action for U.S. Appl. No. 10/097,996, Jun. 6, 2006, pp. 1-10, Alexandria, VA, USA.

United States Patent and Trademark Office, Office Action for U.S. Appl. No. 10/097,996, Feb. 26, 2007, pp. 1-11, Alexandria, VA, USA.

United States Patent and Trademark Office, Office Action for U.S. Appl. No. 10/097,996, Aug. 3, 2007, pp. 1-10, Alexandria, VA, USA.

United States Patent and Trademark Office, Office Action for U.S. Appl. No. 10/097,996, Dec. 28, 2007, pp. 1-10, Alexandria, VA, USA.

United States Patent and Trademark Office, Notice of Allowance for U.S. Appl. No. 10/097,996, Jul. 15, 2008, pp. 1-7, Alexandria, VA, USA.

United States Patent and Trademark Office, Notice of Allowance for U.S. Appl. No. 12/237,272, Sep. 16, 2010, pp. 1-15, Alexandria, VA, USA.

Judith Arato et al., The Evolution of Jini Technology in Telematics, Article, Oct. 2001, pp. 1-18, PsiNaptic Inc., Canada.

Ajit Sagar, Implementing the EventListener Interface, DevX Tech Tips, webpage/site: http://www.devx.com/free/tips/tipview.asp?content_id=1441, Dec. 14, 2001, pp. 1-2, Published on the World Wide Web.

Ajit Sagar, Understanding the Listener Pattern, DevX Tech Tips, webpage/side: http://www.devx.com/registered/tips/tipview.asp?content_id=1389, Dec. 14, 2001, pp. 1-2, Published on the World Wide Web.

Kare Synnes, Questions on the Listener Pattern?, Centre for Distance-spanning Technology, webpage/site: http://www.cdt.luth.se/~unicorn/courses/smd104/lectures/Java_Threads/slide10.html, Dec. 14, 2001, pp. 1-10, Published on the World Wide Web.

Author Unknown, Jini Architecture Specification, Specification, Dec. 2001, Version 1.2, pp. 1-22, Sun Microsystems, Inc., Palo Alto, CA, U.S.A.

INTER-OBJECT COMMUNICATION

RELATED APPLICATIONS

This application is a continuation of, claims priority to, and claims the benefit of U.S. patent application Ser. No. 10/097,996, titled "APPARATUS AND METHOD FOR INTER-OBJECT COMMUNICATION," which was filed in the U.S. Patent and Trademark Office on Mar. 14, 2002, now issued as U.S. Pat. No. 7,464,384, and U.S. patent application Ser. No. 12/237,272, titled "APPARATUS AND METHOD FOR INTER-OBJECT COMMUNICATION," which was filed in the U.S. Patent and Trademark Office on Sep. 24, 2008, now issued as U.S. Pat. No. 7,877,756, both of which are incorporated herein by reference in their entirety.

BACKGROUND OF THE INVENTION

1. Technical Field

The present invention is directed to an apparatus and method for inter-object communication. More specifically, the present invention provides a mechanism for tracking object references between separately installable and replaceable modules in an object oriented system.

2. Description of Related Art

Dynamic Object Oriented Languages, such as Java™ and Smalltalk™, have become common for implementing complex software systems. These languages implement the illusion of a computation module in which loosely coupled objects interact by making requests of each other. These languages typically provide an object oriented memory management system in which the resources needed to implement an object (typically storage) are explicitly allocated when required, but do not have to be explicitly freed. The run-time implementation of the language (often called the virtual machine) maintains a root set of objects and ensures that any objects which can be transitively reached from those root objects will be maintained. Objects which are no longer reachable may have their resources reclaimed for reuse. This reclamation is commonly called garbage collection.

Later implementations of virtual machines have provided for certain references between objects to be marked as weak. In finding paths from root objects during garbage collection, weak references are not counted, and so objects only reachable through paths containing weak references can be reclaimed. In other words, at least one strong reference is required to maintain an object. In Java this mechanism is implemented in the package java.lang.reference.

These languages have enabled and fostered the implementation of systems in which independently developed collections of objects can operate within the same system and interact. The objects can be brought into interaction through a variety of techniques. For example, specific code may be written to tie independently developed objects together. Alternatively, a visual programming paradigm may be used to allow "power users" to assemble applications from a toolkit of objects. More recently, systems have been developed which provide frameworks for discovery of other objects based on their characteristics.

Two such frameworks that are of interest in understanding the current invention are OSGi™ Jini™. The OSGi framework supports the interaction of independently developed collections of objects. Such collections are termed "bundles" in the OSGi architecture. OSGi bundles may be manually configured using properties. OSGi also provides discovery mechanisms for bundles based on bundles publishing one or more "service interfaces." One of the primary goals of the OSGi framework is to allow bundles to be independently installed, started, stopped, and removed. The success in attaining this goal, however, depends on the details of how the bundles are written.

Problems arise in the OSGi architecture because a bundle which obtains services from a second bundle logically owns objects related to those services, but the objects in question are physically associated with the second bundle. If the first bundle maintains references to these objects, the second bundle will not be able to completely unload when required because the virtual machine will maintain some of its objects.

Many of the common techniques in object oriented design give rise to such references. For example, a commonly used technique called the listener pattern allows for objects to register interest in receiving events relevant to another object. One of the first implementations of the listener patters was the object dependency mechanism implemented in the Smalltalk-80 language. In the Smalltalk-80 language, any object could have a list of dependants (listeners). Because many objects did not have dependents, Smalltalk-80 objects did not in general maintain direct references to their listeners. Instead, a central registry was provided which associated a list of dependents with each object that had dependents.

This implementation conserves resources because of the sparse use of dependency. However, this implementation causes a problem in that establishing a dependency relationship causes references from a root object (the dependency registry) to both the object and each of its dependents. Unless dependency relations are explicitly broken, such objects will never be reclaimed. Later implementations used weak references in the registry. This solved the problem, but also was incompatible with applications which solely used the dependents registry to keep objects "alive."

The OSGi framework uses the listener pattern to allow objects to receive events about the coming and going of service registrations. The OSGi architects soon realized that this causes the same kind of problems with "zombie" references as did the Smalltalk-80 dependents mechanism. Because of this, the architects introduced a new pattern called "Whiteboard" which uses OSGi service registry as a way of implementing listener registration. While this solves the immediate problem of the listener pattern, it does not solve the general problem of providing loosely coupled object references between bundles. The present invention addresses this more general problem.

The JINI™ framework provides mechanisms for Java objects to discover each other and interact over a network. The JINI framework needed to address the problems of partial hardware failures and communication channel failures. In JINI, unlike the case in the OSGi framework, the different objects are located in different physical machines and communicate over unreliable links. Failure modes include failure of a remote machine or disruption of communications. To address this problem, JINI uses a pattern called leasing. In this pattern, when an object requests a service such as listener registration, or transaction initiations from a second object, the interaction is represented by a lease object returned as a result of the request for service initiation. The lease includes an explicit time for termination, which is negotiated between the two objects. The first object requests a time interval, and the second may either agree, reduce the time interval, or decline entirely. The client may request extension of the lease prior to its termination, subject to the same negotiation over the extension period. The benefit of the leasing pattern is that if a partial failure occurs, both client and server can release any resources associated with the interaction when the lease expires, without need for further communication.

The leasing pattern, while ideally suited for distributed systems with partial failure behavior is unnecessarily complicated and undesirable in the typical OSGi framework which runs in a single hardware environment. For example, in the absence of partial hardware or communication failures, there is no need for lease renewal.

Thus, it would be beneficial to have an apparatus and method for detecting and recovering from software failures in one of a pair of communicating modules/bundles in a single hardware environment. In addition, it would be beneficial to have an apparatus and method for handling intentional stopping or removal of one or more modules/bundles by a third party, e.g., an operator interface application.

SUMMARY OF THE INVENTION

The present invention provides an apparatus and method for managing inter-object communication. With the apparatus and method of the present invention, objects obtain licenses to interact with one another via a licensing framework. When an object wishes to enter into an interaction with another object, the first object presents its license to the second object. The second object then sends a request to the framework requesting that a partnership between the objects be generated. The partnership request includes an identification of the two objects' licenses.

The objects' licenses are then validated and, assuming the licenses are valid, a partnership object is created. References to the partnership object are forwarded to the objects which then use the reference to the partnership object to communicate with the other object in the partnership rather than a direct reference to the other partner object.

When one object of the partnership lapses, by failure of a module with which the object is associated, for example, a lapse event is posted to the licensing framework. In response to the lapse event, the licensing framework determines the partnerships of the lapsed object. The partner objects of the partnerships in which the lapsed object was active are identified and informed of the lapse of the object. The partnership objects are then torn down and resources reclaimed. The partner objects may then perform their own cleanup operations to reclaim resources.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a mechanism for tracking object references between separately installable and replaceable modules in object oriented systems. The present invention operates in a single hardware environment, e.g., on a single computing device, rather than in a distributed data processing system environment such as with JINI™. Thus, the present invention operates in an environment in which communication link failures between distributed computing devices is not an issue. In this way, the apparatus and methods of the present invention are simplified when compared to the mechanisms of JINI.

Figure 1:
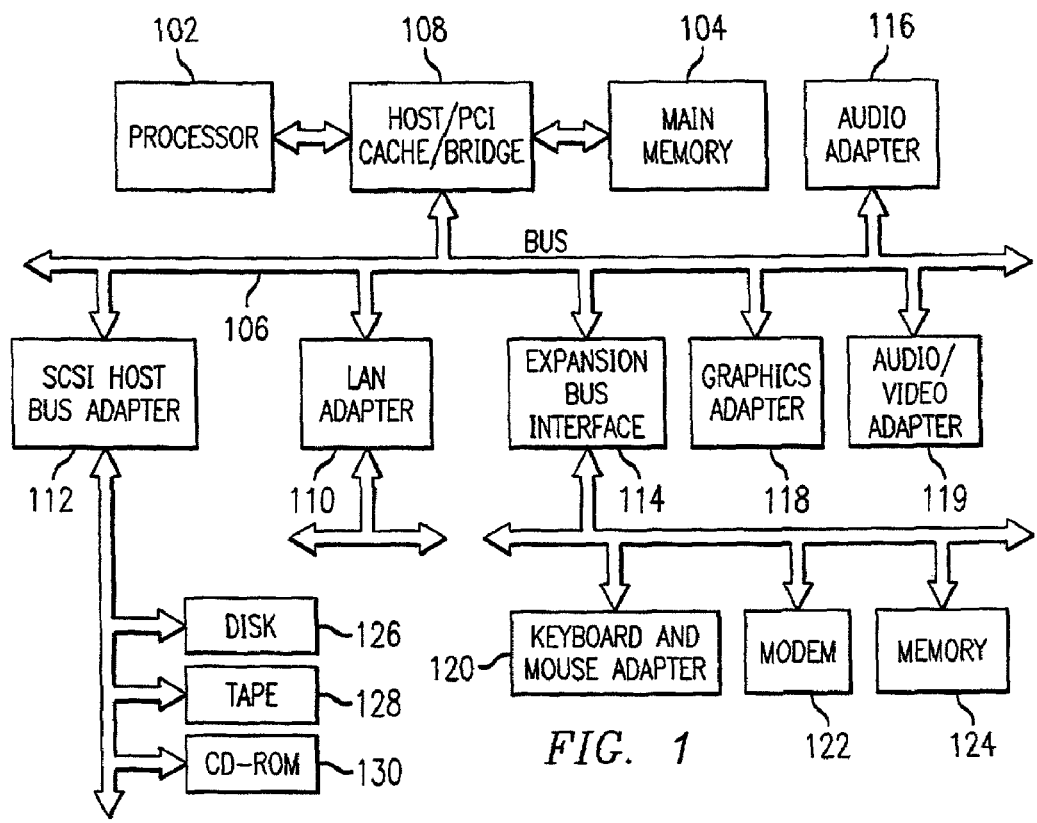
FIG. 1 is an exemplary block diagram of a computing environment in which the present invention may be implemented.

With reference now to the figures, FIG. 1 is a block diagram illustrating a data processing system in which the present invention may be implemented. Data processing system 100 is an example of a client computer. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. Small computer system interface (SCSI) host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system, such as Windows 2000, which is available from Microsoft Corporation. An object oriented programming system such as Java may run in conjunction with the operating system and provide calls to the operating system from Java programs or applications executing on data processing system 100. "Java" is a trademark of Sun Microsystems, Inc. Instructions for the operating system, the object-oriented operating system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

As another example, data processing system 100 may be a stand-alone system configured to be bootable without relying on some type of network communication interface, whether or not data processing system 100 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 1 and above-described examples are not meant to imply architectural limitations. For example, data processing system 100 also may be a notebook computer or hand held computer in addition to taking the form of a PDA. Data processing system 100 also may be a kiosk or a Web appliance.

In known object oriented systems, such as the Open Services Gateway Initiative (OSGi)™ architecture, objects interact with one another through direct references to the other objects. In other distributed data processing environment object oriented systems, such as the JINI™ architecture, for example, objects interact with one another through the use of leases between objects using a service and the service object itself. Such leases do not require reliable communications or that both parties remain viable. Therefore, complicated mechanisms for handling communication failures must be included in the JINI architecture.

Thus, in a single hardware environment, if object A is to interact with object B, object A must include a specific reference to object B. This arrangement leads to problems when one of the objects lapses through a change in the state of the object. For example, if object B fails, the failure of object B may not be reported back to object A. Thus, object A will continue to maintain a reference, e.g., a lease, to object B and may continue to attempt to interact with object B even after object B is no longer available. Moreover, if the reference to object B is an exclusive lease, other objects may not be able to interact with object B until the lease expires even though object A is no longer interacting with object B. Such a situation wastes valuable system resources which could be reclaimed.

Simply applying the mechanisms of JINI to a single hardware environment does not provide an optimal solution to the above problem. The JINI architecture requires that a complicated mechanism for monitoring and handling communications between distributed computing devices be used. In a single hardware environment, such communication failures are typically not encountered. Thus, the JINI architecture creates a large amount of overhead unnecessarily. Therefore, a new mechanism is needed for addressing the problem of lapsed objects in a single hardware environment.

As mentioned above, the present invention provides a mechanism for tracking the object references between modules in an object oriented system so that the drawbacks of the prior art systems are avoided. An example of such an object oriented system is the OSGi gateway system in which the modules are referred to as "bundles."

The present invention provides tracking functions through a registry service. The registry service issues licenses to objects of modules indicating that they are authorized to form partnerships with other objects of the same or different modules. Under the methodology of the present invention, only licensed objects may interact with one another and form "contracts" with other licensed objects. A "contract" is an agreement by one licensed object to interact with another licensed object. Partnerships in the present invention are the associations of licensed objects centered around contracts between the licensed objects.

With the present invention, when a first object attempts to interact with a second object, the first object presents its license to the second object. The second object then determines whether it is willing to enter into a contract with the first object. If the second object is willing to enter into the contract, the second object presents its license and the license of the first object to the registry service requesting that a partnership be formed between the objects.

The registry service receives the licenses of the objects that are attempting to form a partnership and verifies them. If both licenses are valid, the partnership is formed and an appropriate data structure is maintained by the registry service for the formed partnership. If one or more of the licenses are not valid, the partnership may be refused with an error condition being returned to the requesting object.

If this partnership is formed, the objects then interact through references to the partnership and not with specific references to each other. Thus, a loose coupling of objects through partnerships that are managed through a licensing framework is provided such that specific references to the objects are eliminated.

If one of the objects in a partnership lapses, the licensing framework of the present invention informs the other objects that have partnerships with that object of the lapse. In this way, these other objects can perform internal clean-up operations in response to the termination of the partnership. For example, a communications service may close a connection, a transaction context service may abort an open transaction, and the like.

By a partnership lapsing, what is meant is that a circumstance occurs wherein one of the partners is removed, dissolves the partnership, surrender's its license, is garbage collected, or the like. A partner may be removed by stopping the module and removing it. In an OSGi framework, the module, or bundle, may be removed by, for example, monitoring service events as provided by the OSGi framework. The partnership may be dissolved by invoking a dissolve( ) function on the partnership causing the framework to remove the partnership after notifying the other partners if it implements the licensee interface. An object's license may be surrendered by invoking a surrender( ) function on the license causing the framework to remove the license and any partnerships with that license.

In a system with weak references, the license registry may use weak references from the license to the licensed object and monitors these weak references via the mechanisms provided in the system virtual machine. In the event that an object is subject to garbage collection, the license registry may inform the other partners implementing the licensee interface of the removal of the object.

By using partnerships to govern the interaction between licensed objects, the present invention allows for the "graceful" removal of one or more of the objects from the partnership without references to those objects continuing to exist. Furthermore, the other objects in the partnership may be informed of the removal of an object from the partnership so that clean-up procedures may be performed.

There are many example implementations of objects with which the present invention may operate. For example, a module may provide for communication between a computing system and other devices outside the computing system. Such a module may perform maintenance of information about open connections and which objects held each open connection. Another module might provide notification of events of interest to other modules. In a residential control system, a module might monitor the security system and notify other modules of events like motion detection in particular zones. In yet another example, a module might provide transaction context service which would allow one or more other modules to coordinate their actions and provide for committing or aborting a transaction. Any possible application of objects may make use of the features of the present invention.

As noted above, a partnership represents a particular relationship between two licensed objects owned by installed modules in a computer system. Each partnership has two licensees, a first licensed object and a second licensed object. For example, a module providing a communication service may create a partnership with itself as a first licensed object and a requesting object as a second licensed object. The partnership is then used to represent the connection internally to the computing system.

Separate licensed objects can be used to represent different multi-way relationships between modules. A license can enumerate all of the other licenses that are in either a first licensed object or second licensed object relationship with itself. For example, an event notification service may use a single license that it partners with any other licenses that require notification about events. The single license can then be used to enumerate all of the second parties whenever it needs to send notifications.

In a transaction context service, a licensed object may be created to represent each transaction. A partnership may be registered between the transaction and any objects in other modules which wish to enter the transaction. By implementing the licensee interface in the license representing the transaction context, the transaction service may automatically abort the transaction when one of the partners leaves the partnership unexpectedly. Of course other applications of the present invention may be used without departing from the spirit and scope of the present invention.

Figure 2:
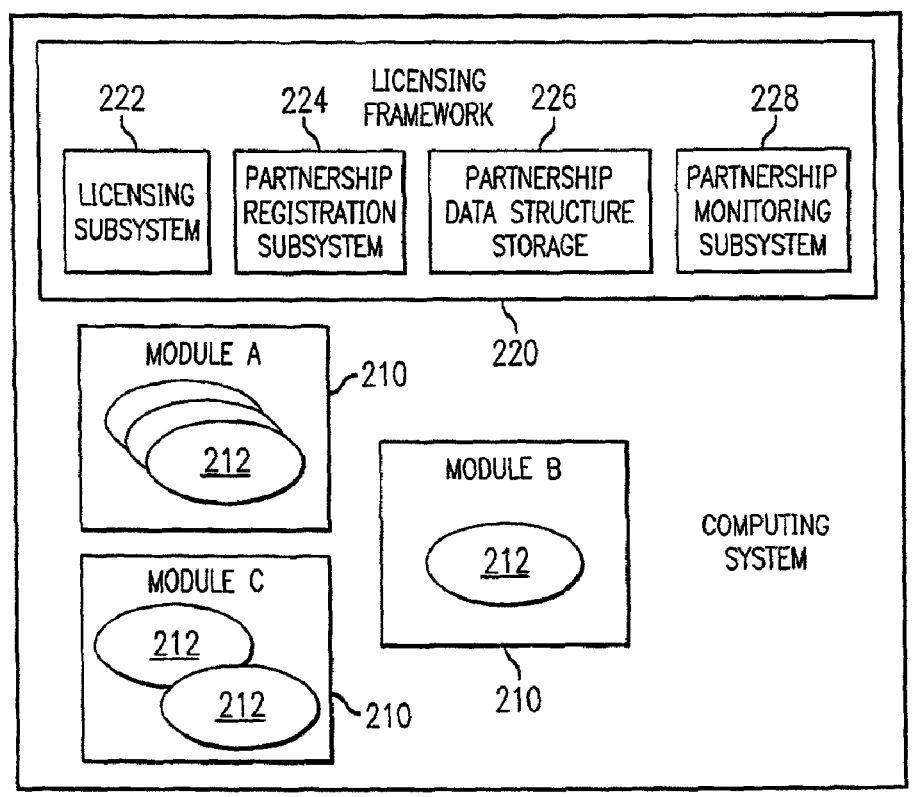
FIG. 2 is an exemplary block diagram illustrating a licensing framework according to the present invention.

FIG. 2 is an exemplary block diagram illustrating a licensing framework according to the present invention. The elements shown in FIG. 2 may be implemented in hardware, software, or any combination of hardware and software without departing from the spirit and scope of the present invention. In a preferred embodiment, the elements in FIG. 2 are implemented as software instructions executed by one or more computing devices.

As shown in FIG. 2, a number of installed modules 210 are present in a computing system. These modules 210 include one or more objects 212, or may themselves be represented as objects. Although a single computing system is shown in FIG. 2, it should be appreciated that the elements shown in FIG. 2 may be distributed over a plurality of different computing devices connected by one or more networks.

The computing system further includes a licensing framework 220 that includes a licensing subsystem 222, a partnership registration subsystem 224, a partnership data structure storage 226, and a partnership monitoring subsystem 228. The licensing subsystem 222 provides licenses to valid objects 212 owned by the modules 210. The purpose for objects to obtain licenses is to register the object as a citizen of a particular module so that the partnership monitoring subsystem 228 may properly monitor licensed objects whose modules become inactive or stop.

The policies of whether or not an object is able to obtain a license are application specific. In an OSGi framework, for example, the license framework of the present invention may use a permission mechanism provided by the OSGi framework to allow or disallow access to the license creation application program interface (API) from a particular bundle. Other mechanisms for determining whether or not to license and object for use in partnerships may be used without departing from the spirit and scope of the present invention.

The partnership registration subsystem 224 creates partnerships between requesting licensed objects that need to interact. The partnership registration subsystem 224 generates partnership objects and stores them in the partnership data structure storage 226. The licensed objects may then interact through references to the partnership object rather than having references to each other. In this way, inter-module references are centralized within the licensing framework 220.

The partnership monitoring subsystem 228 monitors established partnerships for the lapse of one or more of the partnership participants. If an object lapses, either through failure, revoking of the license, etc., an event is posted to the partnership monitoring subsystem 228. The partnership monitoring subsystem 228 then checks the established partnership objects in the partnership data structure storage 226 for any partnership objects in which the lapsed object is a participant and informs the other participants in the partnership object of the lapse. In this way, the other partnership participants may perform clean-up operations and reclaim system resources.

Figure 3:
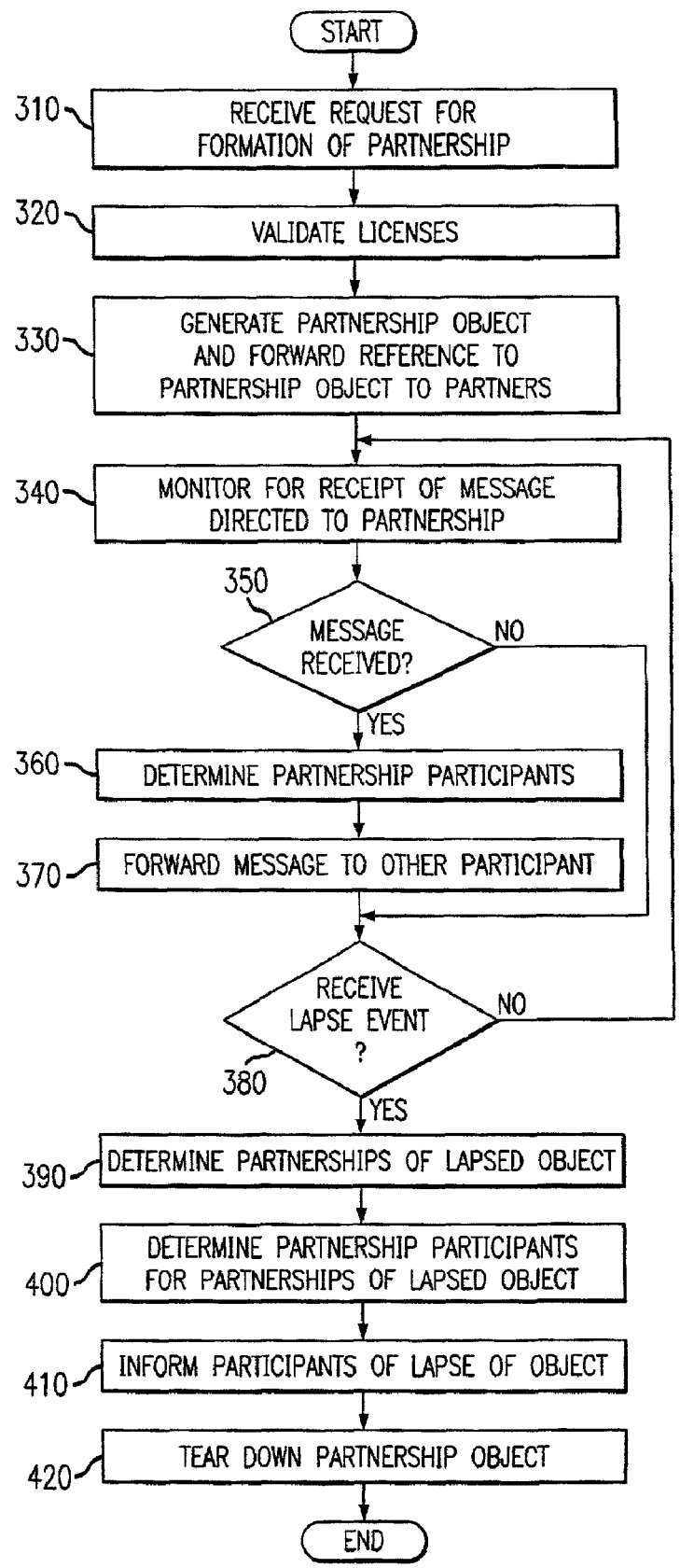
FIG. 3 is a flowchart outlining an exemplary operation of the present invention when forming a partnership between objects and for informing partnership participants of a lapse in the activity of one of the other partnership participants.

FIG. 3 is a flowchart outlining an exemplary operation of the present invention when forming a partnership between objects and for informing partnership participants of a lapse in the activity of one of the other partnership participants. As shown in FIG. 3, the operation starts with receiving a request for formation of a partnership (step 310). The licenses of the objects requesting the partnership are validated (step 320). Assuming that the objects' licenses are valid, a partnership object is generated and a reference to the partnership object is forwarded to the partners (step 330).

The operation then monitors the partnership framework for receipt of a message directed to the partnership (step 340). A determination is made as to whether a message is received (step 350). If so, the partnership participants for the partnership to which the message is directed are determined (step 360). The message is then forwarded to the other partner, i.e. the partner that did not send the message, in the partnership (step 370).

Thereafter, or if no message is received, a determination is made as to whether a lapse event indicating a lapse in the activity of a partner object is received (step 380). If not, the operation returns to step 340. If a lapse event is received, the partnerships of the lapsed object are determined (step 390). The partnership participants for partnerships of the lapsed object are determined (step 400). The partnership participants are then informed of the lapse of the object (step 410). The partnership object is then torn down (step 420) and the operation ends. In this way, the partnership objects informed of the lapse of the object may perform their own cleanup operations and thereby reclaim system resources that might otherwise remain tied up.

Thus, the present invention provides a mechanism for efficient management of object interactions so that resources are not wasted. The present invention provides a mechanism for objects to enter into partnerships that allow interaction of objects by references to the partnership rather than the specific objects themselves. In this way, a loose coupling is provided between objects and thus, decoupling is made simpler and more efficient.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of managing interactions between objects in an object oriented computing environment, comprising:
   receiving, at a licensing framework executing on a computing device, a first request for forming a partnership between a first object and a second object from the second object, where the first request comprises an identifier of a first license issued to the first object and a second license issued to the second object by the licensing framework;
   determining whether the first license and the second license are valid;
   responsive to determining that both the first license and the second license are valid, generating a first partnership object that manages an interaction between the first object and the second object, where the first partnership object comprises a first partnership between the first object and the second object;
   providing a reference to the first partnership object to the first object and the second object, where the first object and the second object communicate via the first partnership object;
   monitoring for lapse events associated with partnership objects;
   responsive to determining that a lapse event for the first partnership object has not been posted:
      processing messages between the first object and the second object using the reference to the first partnership object; and
   responsive to determining that the lapse event for the first partnership object has been posted:
      determining the first partnership of the lapsed first partnership object;
      identifying the first object and the second object as partner objects of the first partnership of the lapsed first partnership object;
      informing the first object or the second object of the lapse event using the reference to the first partnership object; and
      tearing down the lapsed first partnership object, where the first object and the second object reclaim system resources that were used during the first partnership in response to the tearing down of the lapsed first partnership object.

2. The method of claim 1, further comprising posting the lapse event in response to an event selected from a group consisting of:
   execution of one of the first object and the second object of the first partnership being stopped;
   one of the first object and the second object of the first partnership dissolving the first partnership;
   one of the first object and the second object of the first partnership surrendering its issued license; and
   one of the first object and the second object of the first partnership being garbage collected from a memory associated with the computing device.

3. The method of claim 2, where one of the first object and the second object of the first partnership dissolving the first partnership comprises the one of the first object and the second object of the first partnership invoking a dissolve( )function on the first partnership.

4. The method of claim 2, where one of the first object and the second object of the first partnership surrendering its issued license comprises the one of the first object and the second object of the first partnership invoking a surrender( )function on its issued license.

5. A method, comprising:
   issuing, via a licensing framework executing on a computing device, licenses to each of a plurality of objects, where a first object and a second object comprise two objects of the plurality of objects, and a first license and a second license comprise two of the issued licenses;
   receiving, at the licensing framework executing on the computing device, a first request for forming a partnership between the first object and the second object from the second object, where the first request comprises an identifier of the first license issued to the first object and the second license issued to the second object by the licensing framework;
   determining whether the first license and the second license are valid;
   responsive to determining that both the first license and the second license are valid, generating a first partnership object that manages an interaction between the first object and the second object, where the first partnership object comprises a first partnership between the first object and the second object;
   providing a reference to the first partnership object to the first object and the second object, where the first object and the second object communicate via the first partnership object;
   generating additional partnership objects for each additional requested partnership between objects of the plurality of objects in response to determining that each object associated with each additional requested partnership has a valid license;
   providing a reference to each generated additional partnership object to the objects associated with each additional requested partnership; and
   tearing down lapsed partnership objects.

6. The method of claim 5, where generating a first partnership object that manages an interaction between the first object and the second object comprises generating the first partnership object as a data structure within a memory associated with the computing device.

7. An apparatus for managing interactions between objects in an object oriented computing environment, comprising:
   a memory; and
   a processor programmed to:
      receive a first request for forming a partnership between a first object and a second object from the second object, where the first request comprises an identifier of a first license issued to the first object and a second license issued to the second object;
      determine whether the first license and the second license are valid;

responsive to determining that both the first license and the second license are valid, generate a first partnership object that manages an interaction between the first object and the second object, where the first partnership object comprises a first partnership between the first object and the second object;

provide a reference to the first partnership object to the first object and the second object, where the first object and the second object communicate via the first partnership object;

monitor for lapse events associated with partnership objects;

responsive to determining that a lapse event for the first partnership object has not been posted:
   process messages between the first object and the second object using the reference to the first partnership object; and responsive to determining that the lapse event for the first partnership object has been posted:
   determine the first partnership of the lapsed first partnership object;
   identify the first object and the second object as partner objects of the first partnership of the lapsed first partnership object;
   inform the first object or the second object of the lapse event using the reference to the first partnership object; and
   tear down the lapsed first partnership object, where the first object and the second object reclaim system resources that were used during the first partnership in response to the tearing down of the lapsed first partnership object.

8. The apparatus of claim 7, where the processor is further programmed to post the lapse event in response to an event selected from a group consisting of:
   execution of one of the first object and the second object of the first partnership being stopped;
   one of the first object and the second object of the first partnership dissolving the first partnership;
   one of the first object and the second object of the first partnership surrendering its issued license; and
   one of the first object and the second object of the first partnership being garbage collected from the memory.

9. The apparatus of claim 8, where one of the first object and the second object of the first partnership dissolving the first partnership comprises the one of the first object and the second object of the first partnership invoking a dissolve( )function on the first partnership.

10. The apparatus of claim 8, where one of the first object and the second object of the first partnership surrendering its issued license comprises the one of the first object and the second object of the first partnership invoking a surrender( )function on its issued license.

11. An apparatus, comprising:
   a memory; and
   a processor programmed to:
      issue licenses to each of a plurality of objects, where a first object and a second object comprise two objects of the plurality of objects, and a first license and a second license comprise two of the issued licenses;
      receive a first request for forming a partnership between the first object and the second object from the second object, where the first request comprises an identifier of the first license issued to the first object and the second license issued to the second object;
      determine whether the first license and the second license are valid;
      responsive to determining that both the first license and the second license are valid, generate a first partnership object that manages an interaction between the first object and the second object, where the first partnership object comprises a first partnership between the first object and the second object;
      provide a reference to the first partnership object to the first object and the second object, where the first object and the second object communicate via the first partnership object;
      generate additional partnership objects for each additional requested partnership between objects of the plurality of objects in response to determining that each object associated with each additional requested partnership has a valid license;
      provide a reference to each additional generated partnership object to the objects associated with each additional requested partnership; and
      tear down lapsed partnership objects.

12. The apparatus of claim 11, where, in being programmed to generate a first partnership object that manages an interaction between the first object and the second object, the processor is programmed to generate the first partnership object as a data structure within the memory.

13. A computer program product for managing interactions between objects in an object oriented computing environment comprising a computer readable storage medium including computer readable program code, where the computer readable program code when executed on a computer causes the computer to:
   receive a first request for forming a partnership between a first object and a second object from the second object, where the first request comprises an identifier of a first license issued to the first object and a second license issued to the second object;
   determine whether the first license and the second license are valid;
   responsive to determining that both the first license and the second license are valid, generate a first partnership object that manages an interaction between the first object and the second object, where the first partnership object comprises a first partnership between the first object and the second object;
   provide a reference to the first partnership object to the first object and the second object, where the first object and the second object communicate via the first partnership object;
   monitor for lapse events associated with partnership objects;
   responsive to determining that a lapse event for the first partnership object has not been posted:
      process messages between the first object and the second object using the reference to the first partnership object; and
   responsive to determining that the lapse event for the first partnership object has been posted:
      determine the first partnership of the lapsed first partnership object;
      identify the first object and the second object as partner objects of the first partnership of the lapsed first partnership object;
      inform the first object or the second object of the lapse event using the reference to the first partnership object; and
      tear down the lapsed first partnership object, where the first object and the second object reclaim system resources that were used during the first partnership in response to the tearing down of the lapsed first partnership object.

14. The computer program product of claim 13, where the computer readable program code when executed on the computer further causes the computer post the lapse event in response to an event selected from a group consisting of:
   execution of one of the first object and the second object of the first partnership being stopped;
   one of the first object and the second object of the first partnership dissolving the first partnership;
   one of the first object and the second object of the first partnership surrendering its issued license; and
   one of the first object and the second object of the first partnership being garbage collected from a memory.

15. The computer program product of claim 14, where one of the first object and the second object of the first partnership dissolving the first partnership comprises the one of the first object and the second object of the first partnership invoking a dissolve( )function on the first partnership.

16. The computer program product of claim 14, where one of the first object and the second object of the first partnership surrendering its issued license comprises the one of the first object and the second object of the first partnership invoking a surrender( )function on its issued license.

17. A computer program product for managing interactions between objects in an object oriented computing environment comprising a computer readable storage medium including computer readable program code, where the computer readable program code when executed on a computer causes the computer to:
   issue licenses to each of a plurality of objects, where a first object and a second object comprise two objects of the plurality of objects, and a first license and a second license comprise two of the issued licenses;
   receive a first request for forming a partnership between the first object and the second object from the second object, where the first request comprises an identifier of the first license issued to the first object and the second license issued to the second object;
   determine whether the first license and the second license are valid;
   responsive to determining that both the first license and the second license are valid, generate a first partnership object that manages an interaction between the first object and the second object, where the first partnership object comprises a first partnership between the first object and the second object;
   provide a reference to the first partnership object to the first object and the second object, where the first object and the second object communicate via the first partnership object;
   generate additional partnership objects for each additional requested partnership between objects of the plurality of objects in response to determining that each object associated with each additional requested partnership has a valid license;
   provide a reference to each additional generated partnership object to the objects associated with each additional requested partnership; and
   tear down lapsed partnership objects.

18. The computer program product of claim 17, where, in causing the computer to generate a first partnership object that manages an interaction between the first object and the second object, the computer readable program code when executed on the computer causes the computer to generate the first partnership object as a data structure.

* * * * *